United States Patent
Berwanger

(10) Patent No.: US 6,752,248 B2
(45) Date of Patent: Jun. 22, 2004

(54) MULTI-DISC BRAKE STRUCTURAL ASYMMETRY

(75) Inventor: Fred W. Berwanger, Edwardsburg, MI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/078,634

(22) Filed: Feb. 19, 2002

(65) Prior Publication Data
US 2003/0042083 A1 Mar. 6, 2003

Related U.S. Application Data
(60) Provisional application No. 60/317,012, filed on Sep. 4, 2001.

(51) Int. Cl.[7] .......................... F16D 65/38; F16D 55/36; F16D 13/52
(52) U.S. Cl. ................ 188/73.39; 188/71.5; 188/73.31; 192/70.2
(58) Field of Search .............................. 188/71.5, 18 A, 188/73.1, 73.2, 73.31, 218 R, 218 XL, 73.35–73.39; 192/70.16, 70.17, 70.2; 301/6.1, 6.2, 6.8; 244/111, 110 A, 110 H

(56) References Cited

U.S. PATENT DOCUMENTS

| | | | | |
|---|---|---|---|---|
| 3,829,162 A | * | 8/1974 | Stimson et al. ............... 301/6.2 |
| 4,017,348 A | * | 4/1977 | Shumaker .................... 156/189 |
| 4,018,482 A | * | 4/1977 | Rastogi et al. ............... 301/6.8 |
| 4,269,423 A | * | 5/1981 | Perez ......................... 280/80.1 |
| 4,383,594 A | | 5/1983 | Correll ........................ 188/71.5 |
| 4,696,376 A | | 9/1987 | Reynolds ..................... 188/71.5 |
| 5,014,146 A | * | 5/1991 | Takatsuka et al. ............ 360/266 |
| 5,205,382 A | | 4/1993 | Edmisten .................... 188/71.5 |
| 5,323,881 A | | 6/1994 | Machan ....................... 188/71.5 |
| 5,485,898 A | * | 1/1996 | Patko ......................... 188/71.5 |
| 5,494,138 A | | 2/1996 | Scelsi et al. ............... 188/18 A |
| 5,908,091 A | * | 6/1999 | Berwanger .................. 188/71.5 |
| 6,131,707 A | | 10/2000 | Buechel ...................... 188/218 |

FOREIGN PATENT DOCUMENTS

JP    2000280769 A   * 10/2000

* cited by examiner

Primary Examiner—Douglas C. Butler
Assistant Examiner—Melody M. Burch
(74) Attorney, Agent, or Firm—Larry J. Palguta

(57) ABSTRACT

An axially asymmetrical vibration-reducing torque tube radially surrounds an axle and axially spans brake disks with intervening ones of the brake disks angularly fixed to a torque tube. The torque tube is a hollow generally annular member having an axis, a radially outwardly flared portion near one end to facilitate axially fixing end one of the disks, a flange near the other end thereof adapted to fix the torque tube to the stationary member, and a radially inwardly extending annular support flange intermediate the one and other end for augmenting the support of the tube on the stationary member. Cut-outs in support flange impart dynamic asymmetry to the torque tube and displace its elastic center off-axis of the brake discs, reducing the brake vibration amplitudes. A brake actuating mechanism is operable upon command to axially force the pressure plate toward the end plate compressing the brake disks therebetween.

10 Claims, 2 Drawing Sheets

MULTI-DISC BRAKE STRUCTURAL ASYMMETRY

This application claims priority under 35 U.S.C. §119(e) of U.S. Provisional Application No. 60/317,012 filed on Sep. 4, 2001, the entire contents of which are herein incorporated by reference.

BACKGROUND OF THE INVENTION

1. Field of the Invention

The present invention relates generally to brake systems and more particularly to multi-disk brake systems and techniques for reducing vibrations which occur in such multi-disk brake systems during a braking event.

2. Description of the Related Art

A multi-disk brake system typically has a brake disk stack having alternate disks keyed to and rotatable with a wheel, while intervening disks are keyed to the stationary brake housing. Multi-disk brake systems are frequently used in aircraft. The non-rotating disks are supported by a torque tube which is fixed to the brake housing and extends in an outboard direction in a generally cantilevered manner coaxially surrounding the wheel axle. An end disk at the outboard end of the torque tube is both rotationally and axially fixed to the torque tube. When one or more brake actuators are energized, corresponding pistons force a brake pressure plate to compress the disk stack between the pressure plate and end plate, slowing the vehicle. The non-rotating brake structure typically has strong radial and torsional vibration modes that are concentric with the axle. The vibrations result in passenger annoyance and may cause brake control feedback interference. Extended repetitive vibrations events may cause excessive wear, fatigue, or ultimate structural failure. Additional structural features may be added to reduce vibration, but add to the overall weight of the system. It is desirable to reduce braking system vibrations without adding significantly to the weight of the braking mechanism. It is also desirable to provide a braking system which reduces brake-induced vibration, torque oscillations, hydraulic pressure oscillations, and unnecessary transfer of brake heat to the axle, all at a very modest increase in braking system cost.

SUMMARY OF THE INVENTION

Braking systems may exhibit an undesirable whirl vibration during a braking event. The present invention reduces principally whirl-mode vibrations produced by multi-disc brakes leading to structural wear and failure, or brake control feedback interference. The torque tube is a major structural component of the brake. While mounted on the axle, the torque tube has strong radial and torsional vibration modes that are concentric with the axle and the brake discs which energize vibration in surrounding structures. Prior art torque tubes are designed to be symmetric with the axle axis and have an elastic center that lies on that axis. The elastic center is defined as the neutral axis of bending of the structure. The present invention shifts the elastic center of the torque tube to lie off-axis of the brake disks, and imparts vibration mode asymmetry to the torque tube, for example by employing cut outs or material removal at portions of the torque tube that reduce or weaken vibration modes. By purposefully adding asymmetry to the torque tube, its vibration modes are weaker and not concentric with the axle axis or the brake disks. This significantly reduces the amplitude and duration of brake-induced vibration.

The invention comprises, in one form thereof, a torque tube for angularly fixing alternate disks in a multi-disk brake assembly and limiting axial movement of the alternate disks as well as the intervening disks in the form of a hollow generally annular member having an axis, a radially outwardly flared portion near one end to facilitate axially fixing an end one of the disks, a flange near the other end thereof adapted to fix the torque tube to a stationary member, and a radially inwardly extending annular support flange disposed intermediate the one and other ends for augmenting the support of the tube on the stationary member. The torque tube elastic center is displaced from the axis and the torque tube exhibits asymmetric stiffness.

An advantage of the present invention is that adverse vibration associated with the torque tube is reduced or avoided without increasing the torque tube mass. Also, conductive transfer of brake heat to the axle is reduced.

BRIEF DESCRIPTION OF THE DRAWINGS

Corresponding reference characters indicate corresponding parts throughout the several drawing views.

DETAILED DESCRIPTION OF THE INVENTION

Figure 1:
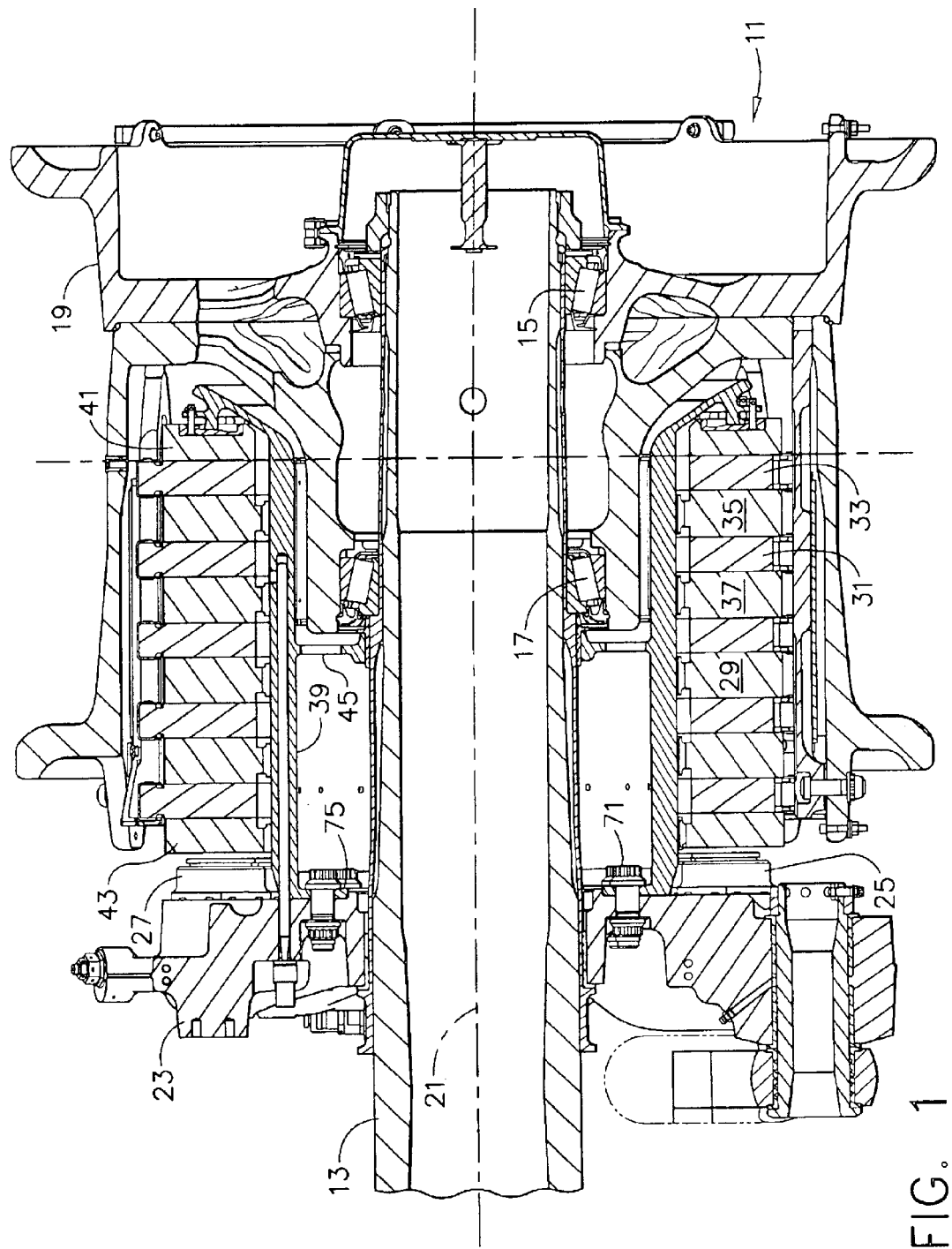
FIG. 1 is a cross-sectional view of a multi-disk braking mechanism and wheel assembly illustrating the orientation of the torque tube relative to the rest of the brake and the interfacing axle and wheel.

Referring now to the drawings and particularly to FIG. 1, there is shown an aircraft wheel and brake assembly 11 having a cantilevered axle 13 which is fixed to the aircraft landing gear. The axle 13 has tapered roller bearings 15 and 17 rotatably supporting a wheel rim 19. Wheel rim 19 is thereby journalled for rotation about axis 21. The wheel rim 19 has conventional flanges for receiving the bead of a tire (not shown). A brake housing 23 includes a plurality of actuators such as hydraulically actuable pistons 25 and 27. A brake disk stack 29 has alternate disks such as 31 and 33 fixed to and rotatable with the wheel rim 19 while intervening disks such as 35 and 37 are stationary and fixed to housing 23 by way of torque tube 39. Torque tube 39 may include longitudinal ribs providing a keying arrangement to angularly fix alternate ones of the disks and end disk 41 may be fixed to the torque tube 39 both axially and angularly. When braking is initiated, actuators 25 and 27 (perhaps along with a plurality of similar annularly disposed actuators) are energized and their pistons extend forcing the brake pressure plate 43 to compress the disk stack 29 slowing the vehicle as is conventional in multi-disk brake assemblies.

Figure 3:
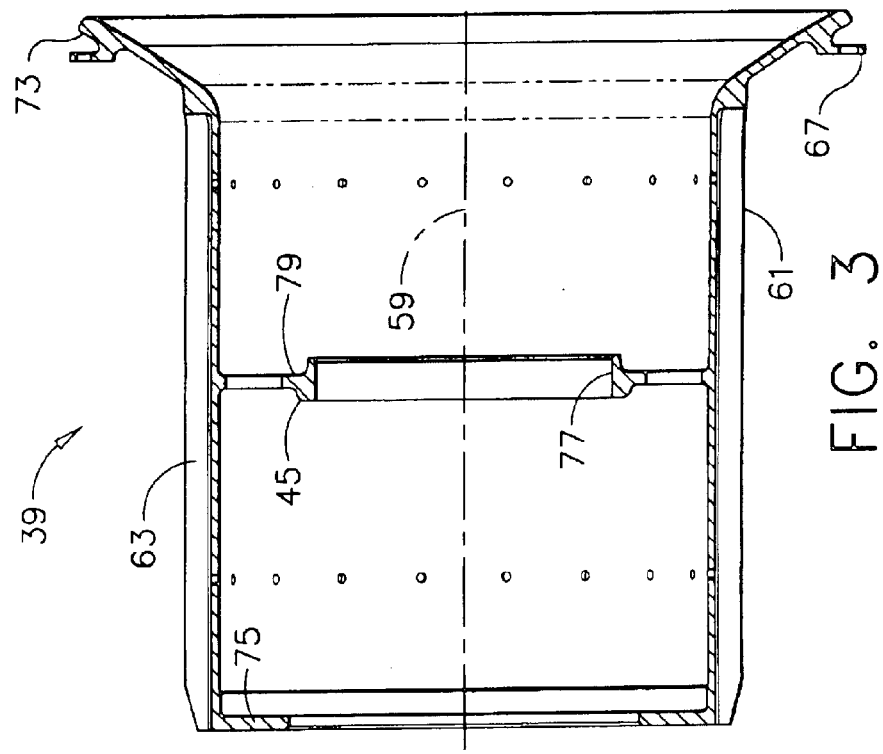
FIG. 3 is a view in cross-section along line 3—3 of FIG. 2.
Figure 2:
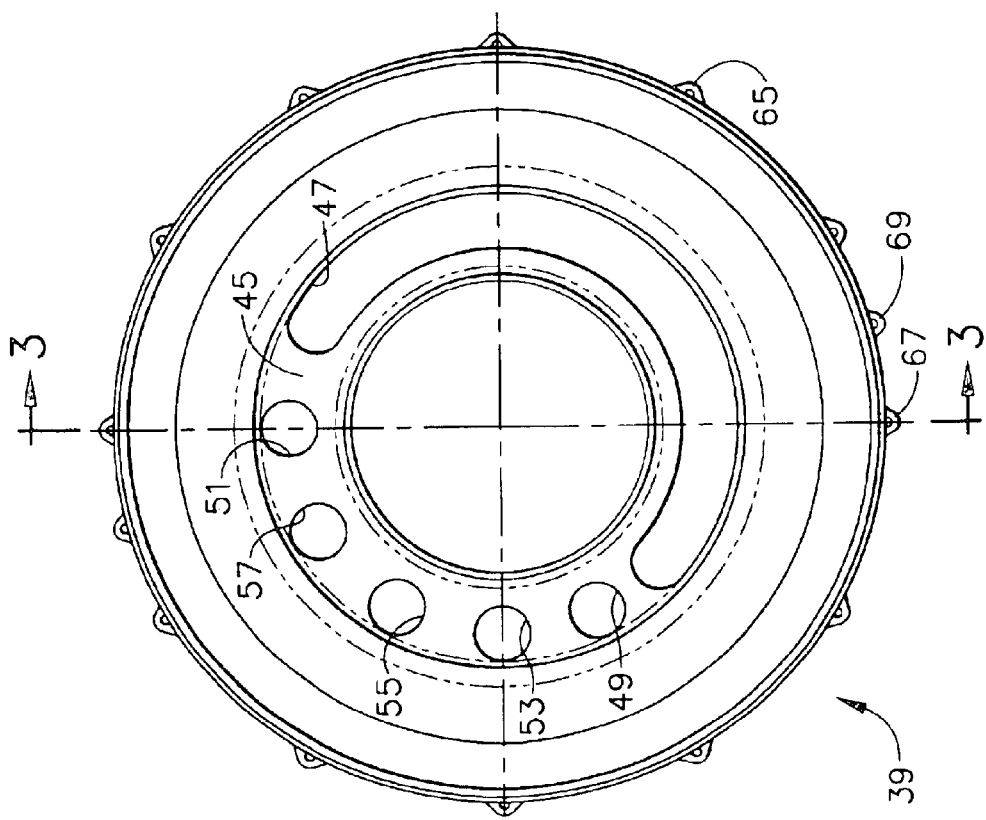
FIG. 2 is an end view of the torque tube of FIG. 1 from the right side thereof illustrating unequal cutouts in the torque tube support structure providing asymmetry.

The torque tube 39 is shown in greater detail in FIGS. 2 and 3. The torque tube is formed as a generally cylindrical volume of revolution about an axis 59 having a radially outwardly flared portion 73 near one end to facilitate axially fixing the end one 41 of the disks and axially confining the disk assembly. Axis 59 coincides with axis 21 when the torque tube is positioned within the braking mechanism of FIG. 1. The tube symmetrically deviates from a volume of revolution by having a plurality of ribs such as 61 and 63 for keying the alternate disks to limit rotation thereof, a plurality of flanges such as 65, 67 and 69 near one end for angularly and axially fixing end disk 41, and a plurality of apertures in an opposite end flange 75 for receiving fasteners such as 71 for fixing the torque tube to the braking structure. Flanges 65, 67 and 69 function to attach the end disk and to transfer torque from the disk stack to the torque tube during a braking event. The torque tube further asymmetrically deviates from a solid of revolution to locate the torque tube elastic center other than on the axis 59. The asymmetric deviation reduces the vibration amplitudes. In one preferred form, the asymmetric deviation from a solid of revolution occurs solely within a support flange 45.

The torque tube includes radially inwardly extending annular support flange or pedestal 45 which is located typically approximately midway along the axis 59. The annular support flange has a radially inner surface 77 for engaging the wheel axle 13 and a web portion 79 radially outward of the surface 77 for augmenting the support of the tube on the braking structure. The support flange includes a plurality of holes 47, 49, 51, 53, 55 and 57 of which 49, 51, 53, 55 and 57 are circular while 47 is a arcuate cut-out and non-circular. The holes 47 and 49, for example, are of different areas. Further, the angular spacing, for example, between holes 47 and 49 is different from the angular spacing between holes 47 and 51. Other non-uniform hole patterns are clearly possible. These radially disposed non-uniform holes impart asymmetry to the support flange 45 and to the entire torque tube 39. The result is a torque tube with an asymmetric radial stiffness.

A volume is symmetrical with respect to a given plane (a plane of symmetry) if, to every point P of the volume, there is a second point P of the volume such that the line PP is perpendicular to the plane and divided into two equal parts by the plane. When a volume has two planes of symmetry, the centroid of the volume must lie on the line of intersection of those two planes. If the volume is of uniform density, the center of gravity (and center of mass) is located at the centroid. Conventional torque tubes are generally cylindrical and symmetric having several planes of symmetry all passing through the axis of the cylinder which axis corresponds with the axis of the wheel axle and the axis of the stack. When the several planes all pass through the central axis, the tube has axial symmetry. A volume having at most one plane of symmetry is asymmetrical. If there are two planes of symmetry and they intersect off-axis, that is, if at most one plane of symmetry passes through the axis, the tube is axially asymmetric. Torque tube 39 is axially asymmetric due to the non-uniformly distributed hole pattern of openings 47, 49, 51, 53, 55 and 57.

In summary, the present invention adds asymmetrical cut-outs to the torque tube in the area of the support flange. The cut-outs impart dynamic asymmetry and shift the elastic center of the torque tube to an off-axis location, reducing brake vibration amplitudes. The primary torque tube loads bypass the effected structure. Asymmetry may also be obtained by varying the thicknesses at other sections of the torque tube. These machined features do not increase mechanical complexity and do not necessarily increase weight.

What is claimed is:

1. A multi-disk brake and wheel assembly, comprising:
a cantilevered wheel axle;
a wheel rim journalled for rotation about the wheel axle;
a plurality of brake disks radially surrounding the wheel axle, alternate ones of the brake disks radially fixed to the wheel rim for rotation therewith;
an end disk at one axial end of the plurality of brake disks;
a pressure plate at the opposite axial end of the plurality of brake disks;
an axially asymmetrical torque tube radially surrounding the wheel axle and axially spanning the plurality of brake disks, intervening ones of the plurality of brake disks being angularly fixed to the torque tube, the torque tube being fixed at one end to a braking structure and having the end disk fixed thereto at the other end thereby axially sandwiching the plurality of brake disks between the end disk and the pressure plate, and the torque tube including an annular radially inwardly extending support flange axially intermediate the torque tube ends for supportingly engaging the wheel axle, the support flange including a plurality of holes, at least two of said holes have different areas, thereby imparting asymmetry to the support flange and to the torque tube; and
a brake actuating mechanism operable upon command to axially force the pressure plate toward the end disk compressing the plurality of brake disks therebetween.

2. The multi-disk brake and wheel assembly of claim 1, wherein certain ones of said holes are circular and at least one of which is non-circular and arcuate.

3. The multi-disk brake and wheel assembly of claim 1, wherein at least some of said plurality of holes are non-uniformly angularly disposed.

4. A torque tube for angularly fixing alternate disks in a multi-disk brake assembly and limiting axial movement of the alternate disks, as well as disks intervening the alternate disks, the torque tube comprising a generally cylindrical annular member formed as a volume of revolution about an axis and symmetrically deviating from the volume of revolution by having a plurality of ribs for keying the alternate disks to limit rotation thereof, a plurality of flanges being arranged in groups in positions on the annular member with at least one of the groups of flanges having a radially outward flared portion and being positioned near one end for angularly and axially fixing an end one of the disks to axially confine said multi-disk brake assembly, a plurality of fastener receiving apertures near an opposite end of the torque tube for fixing the torque tube to a braking structure, the torque tube further asymmetrically deviating from axial symmetry to impart asymmetric dynamic stiffness to the torque tube, and a radially inwardly extending annular support flange located along the axis for augmenting the support of the tube on the braking structure, the torque tube asymmetrically deviating from symmetry with respect to the axis of the torque tube solely within the support flange, wherein the support flange includes a plurality of holes, at least two of said holes have different areas, thereby imparting asymmetry to the support flange and to the torque tube.

5. The torque tube of claim 4, wherein the torque tube elastic center is located off the axis of revolution.

6. The torque tube of claim 4, wherein least one of said holes is non-circular and arcuate.

7. The torque tube of claim 4, wherein at least some of said plurality of holes are non-uniformly angularly disposed.

8. A torque tube for angularly fixing alternate disks in a multi-disk brake assembly and limiting axial movement of the alternate disks, as well as disks intervening the alternate disks, the torque tube comprising a hollow generally annular member having an axis, a radially outwardly flared portion near one end to facilitate axial fixing of an end one of the disks, a flange near the other end disk thereof adapted to fix the torque tube to a stationary member, a radially inwardly extending annular support flange intermediate the one and other end disks for augmenting the support of the tube on the stationary member and for displacing the torque tube elastic center from the axis, and wherein the support flange has a radially inner surface for engaging a wheel axle and a web portion radially outward of the surface including a plurality of holes, certain ones of which are circular and at least one of which is non-circular and arcuate, thereby imparting asymmetry to the support flange and to the torque tube.

9. The torque tube of claim 8, wherein at least two of said plurality of holes have different areas, thereby imparting asymmetry to the support flange and to the torque tube.

10. The torque tube of claim 8, wherein at least some of said plurality of holes are non-uniformly angularly disposed for imparting asymmetry to the support flange and to the torque tube.

* * * * *